Figure 1:
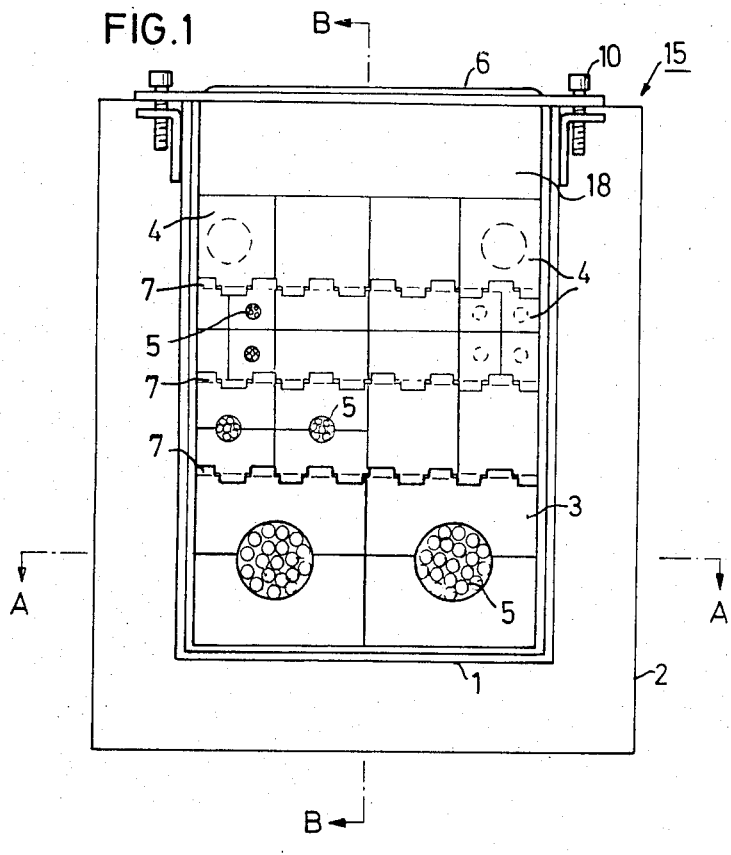

United States Patent [19]

Blomqvist et al.

[11] 4,291,195
[45] Sep. 22, 1981

[54] LEAD-THROUGH FOR THE FIREPROOF DISPOSITION OF ELECTRIC CABLES THROUGH A WALL

[75] Inventors: John-Erik V. Blomqvist; Erik M. Blomqvist, both of Karlskrona, Sweden

[73] Assignee: AB Lyckeaborgs Bruk, Karlskrona, Sweden

[21] Appl. No.: 94,477

[22] Filed: Nov. 15, 1979

[30] Foreign Application Priority Data

Jan. 18, 1979 [SE] Sweden ............................. 7900463

[51] Int. Cl.³ ............................................. H02G 3/22
[52] U.S. Cl. ...................................... 174/48; 169/48; 248/56
[58] Field of Search .................... 174/48, 49, 151; 248/56; 169/48; 285/192

[56] References Cited

U.S. PATENT DOCUMENTS 2,732,226  1/1956  Brattberg ........................ 285/192
3,282,544  11/1966  Brattberg ........................ 248/56
3,489,440  1/1970  Brattberg ....................... 248/56 X
4,093,818  6/1978  Thwaites et al. .................. 174/48

FOREIGN PATENT DOCUMENTS 531592    1/1941  United Kingdom .
1416466  12/1965  United Kingdom .

Primary Examiner—Gene Z. Rubinson
Assistant Examiner—D. A. Tone
Attorney, Agent, or Firm—Cushman, Darby & Cushman

[57] ABSTRACT

A fireproof lead-through with a frame, comprising at least one frame half for fitting on one side of a wall with a rectangularly shaped pack of packing blocks through which cables pass filling the opening in each frame half, and engaging with it peripheral portions in channel-like profiled portions in each frame half. Stay strips with a special configuration engage with their ends in the profiled portions for stiffening the pack of blocks. The transit is made pressure-tight by the use of conventional wedging means or pouring composition.

16 Claims, 8 Drawing Figures

LEAD-THROUGH FOR THE FIREPROOF DISPOSITION OF ELECTRIC CABLES THROUGH A WALL

The present invention relates to a lead-through for the fireproof disposition of electric cables through an opening in a wall, said lead-through or transit comprising a rectangular metal frame, the opening of which is filled by the cables, each of which is surrounded by modularly dimensioned packing pieces or blocks, and stiffening plates which are inserted between rows of blocks to make the pack formed by the blocks more rigid.

Such a transit is known, e.g. through the U.S. Pat. No. 2,732,226, according to which the frame consists of comparatively thick material such as cast iron, and the blocks have considerable dimension in depth, i.e. in the through direction of the cables, when they extend the whole length of the frame opening inner wall. Due to its thickness, the frame thus transfers considerable quantities of heat to the side of the transit not subjected to flames, i.e. its cold side, thus resulting, inter alia, in that the blocks nearest to the frame are unfavourably affected by heat and the transit can only be used in places with relatively low fire safety requirements. The transit is also economically unfavourable, since the blocks have great length in some cases, requiring a corresponding amount of material.

According to prescribed standards for fire safety, a specified temperature on the cold side of a lead-through or transit may not be exceeded after a specified time, when the cables shall still be intact on this side. The time during which the known transit gives protection against the spread of fire is short in comparison with the severer demands placed by newer fire-prevention standards on transits, especially for tankers, oil drilling platforms, power stations or the like.

Furthermore, the frame has comparatively great weight and is therefore expensive to transport.

The invention is thus based on the task of further developing already known transits, so that these meet the new severer standard requirements, while they have less weight, and are economically advantageous to manufacture.

In accordance with the invention this problem is solved by a transit of the kind given in the introduction, by the frame being formed from at least one frame half which can be fitted on one side of the wall directly opposite the opening in the latter, each frame half on at least three sides comprising comparatively thin sheet metal, extending substantially perpendicular to the wall and including a profiled portion in the form of a channel or trough, which has its longitudinal axis substantially parallel to the edge of the sheet remote from the wall, said portion extending towards the wall from the vicinity of this edge, with its bottom in a plane outside each frame half side, while the fourth side of the frame half is formed by at least one pressure plate bearing against the blocks in the transit, said plate having the same profile as the trough-shaped portions of the other three sides along an edge portion remote from the wall and that the opening in each frame half is filled with blocks and through-going cables such that the appropriate sides of peripheral blocks engage against the bottoms of said troughs formed by said profiled portions.

Since each frame half consists of sheet metal, a considerably less amount of heat is transferred than is the case with the known transit.

When the fourth side of the frame half is formed at least by the pressure plate and the frame half opening is filled with blocks and throughgoing cables, the safety time of the transit amounts to between 90 and 120 minutes. Since each frame half is formed with a substantially continuous depressed or channel-like portion, there is the added advantage that the pack of blocks is kept in a desired fixed position by its peripheral side portions engaging the interior surface of said channel-like portion.

According to one modification of the invention, the object thereof is accomplished by the frame being formed by at least one frame half, which can be fitted to one side of the wall directly opposite the opening in the latter, each frame half on three sides comprising comparatively thin sheet metal, extending substantially perpendicular to the wall and including a channel-like profiled portion which has its longitudinal axis substantially parallel to the edge of the sheet remote from the wall, said portion extending towards the wall from the vicinity of this edge and with its bottom in a plane outside each frame side, while the fourth side of the frame half consists of metal sheet with substantially the same form as that of the other three sides, and that the opening in each frame half is filled with blocks and throughgoing cables, such that the respective sides of peripheral blocks engage against the bottoms of said channels formed by said profiled portions.

When the fourth side according to this modification consists of sheet metal over the whole of its area, the transit is especially intended for filling with a pouring composition. The safety time is extended in this way to as much as 6 hours and a pressure-tight transit is obtained.

It is also known, inter alia from the above-mentioned patent specification to use stiffening plates, or so-called stay strips, which are placed between rows of blocks inside the frame and are anchored thereon to keep the blocks in an intended position, while simultaneously stiffening the wall-like pack formed by the blocks. These stay strips are quite rigid and inflexible elements, and when they are fitted they must be introduced at an angle in relation to the horizontal row of blocks. When the space in the upper portion of the transit gets smaller and smaller, this angled insertion creates problems. Furthermore, if a transit already in place is to be supplemented by further throughgoing cables, or if certain cables are to be changed, fitting or dismantling such stay strips can be very problematic.

To remove this drawback, in accordance with one especially suitable embodiment of the transit in accordance with the invention, each stiffening plate is a bendable stay strip of comparatively thin metal plate, engaging with the trough at its ends and being provided along both sides between these ends with tags or tongues extending alternatingly in opposite directions perpendicular to the plane of the strip and thereby along corresponding portions of outsides and insides of the blocks. As a result of this construction, the strip only needs to be bent transverse to its longitudinal direction for it to be easily inserted between cables already in place, and afterwards straightened out so that its ends engage with the channel portions.

Figure 2:
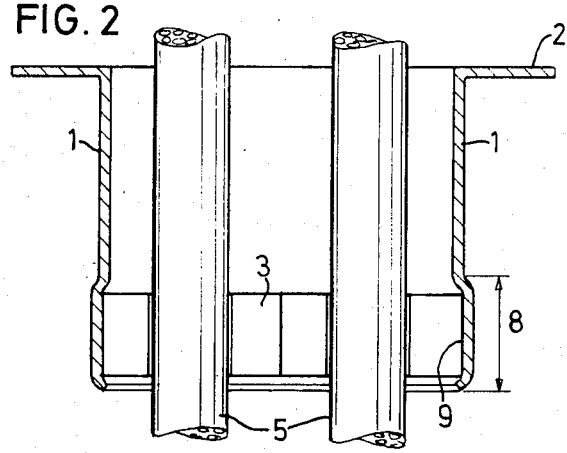
Figure 3:
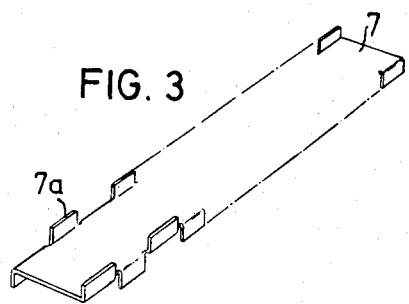
Figure 4:
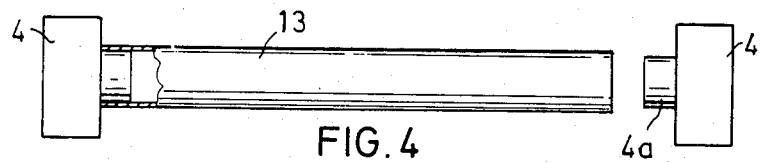
Figure 5:
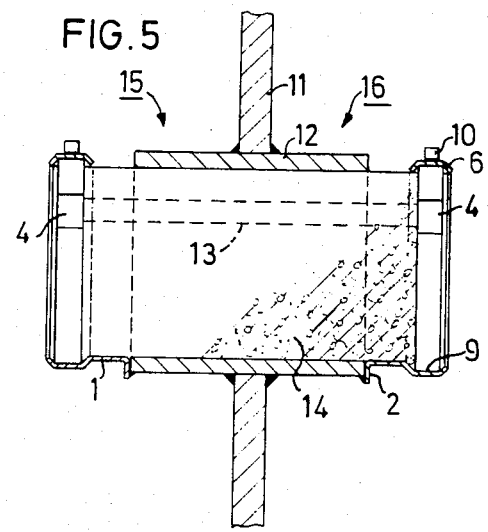
Figure 6:
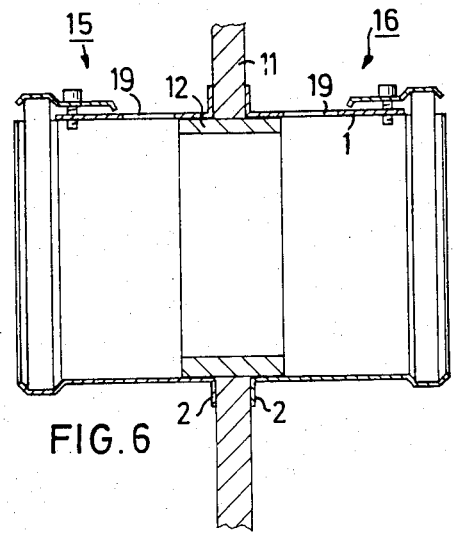
Figure 7:
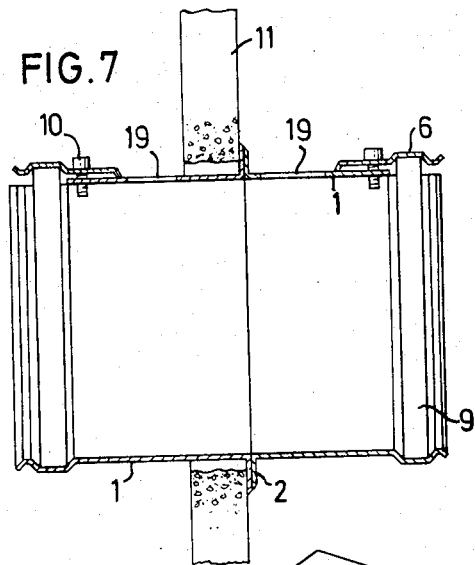
Figure 8:
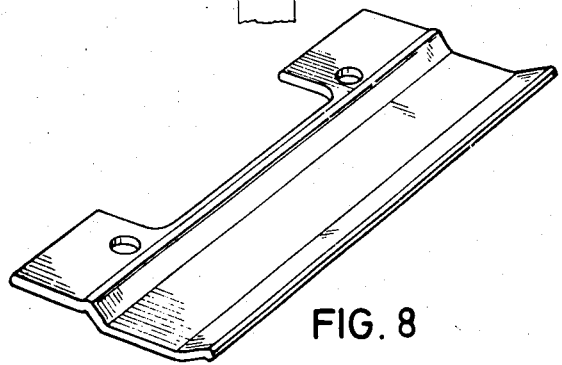

The invention will be described in more detail below in the form of an example while referring to the appended drawings, where FIG. 1 is a front view of the transit in accordance with the invention, FIG. 2 is a cross-sectional view of a frame half along the line A—A in FIG. 1, FIG. 3 is a perspective view of a stay strip, FIG. 4 is a tube with spare blocks for supplementary cables, FIGS. 5-7 are cross-sectional views along the line B—B in FIG. 1 to illustrate different ways of fitting, and FIG. 8 is a perspective view of an embodiment of a pressure plate.

Similar components or parts of the transit are given the same reference numerals in the different figures.

FIG. 1 illustrates a transit in accordance with the invention as seen from either side of a wall 11 in FIGS. 5-7, in the longitudinal direction of the cables. The whole transit thus consists of two frame halves 15 and 16 in FIG. 5, of which one half 15 is shown in FIG. 1 where the bottom and two vertical sides of the frame half consist of sheet metal 1, e.g. sheet steel. This sheet can have a thickness of 3 mm, for example, so that in comparison with frames having a thickness of 6-10 mm used up to now, it has low heat conductivity. Each of said sides extends substantially perpendicular to the wall 11, and along its edge closet to the wall it is provided with an attachment flange 2, intended for attaching to the wall, e.g. by welding or by means of screws or the like. Along the portion farthest from the wall, each side includes a stamped profile portion 8 in the form of a trough or channel, shown in more detail in FIG. 2, and the bottom 9 of this channel is in a plane outside the non-profiled portion of the respective side. Upwards in FIG. 1, on the fourth side of the frame half, there is a pressure plate 6, made of metal such as steel, with an edge portion with the same profile and located so as to register with the channel-like portion described above, so that a substantially continuous channel is formed along the edge of the frame half. According to FIG. 1, the plate 6 is attached to the vertical sides at its ends by means of screws 10 and brackets adapted thereto, but other attachment means are of course also possible. A practical solution can be to provide the plate 6 with sprung hooks at its ends, which snap into engagement in corresponding recesses in the vertical sides, since the plate 6 does not need to exercise any particular pressure, but only has the task of keeping the pack of blocks arranged in the opening of the half frame tightly together.

Cables 5 are passed through the opening in the frame half 15, each cable being surrounded by its respective modularly dimensioned block 3 which is parted in two in a conventional manner and can consist of such material with sufficient mechanical strength, known per se, which on being heated swells to a volume such that it fills the cavities resulting from parts of cables having been destroyed by fire. Such material has especially good fire protection properties, so that the total length or depth of the transit can be kept down. In the opening and preferably in its upper portion, there are also packing blocks 4, lacking through-holes and made as a single body. This type of block 4 is shown in FIG. 4, according to which each such block is formed with a round stud 4a, a thin-walled tube 13 being thrust over these studs 4a at either end, to keep the tube in the intended position between respective blocks in the wall-like block packs, said tube being made from metal or from a material with poor heat conductivity when incorporated in the finished transit 15, 16. If the transit is to be supplemented with further cables at a later occasion, holes of a suitable diameter are made in these reserve blocks for the appropriate cable, the tube then facilitating the passage of a cable. Instead of the studs 4a, it is also conceivable that the tube 13 is kept in place by being thrust into shallow recesses on the inside of the blocks. Finally, a so-called levelling block 18, made from the same material as the blocks 3,4, for example, is inserted nearest to the pressure plate 6. The blocks 3,4 nearest to the vertical sides, and corresponding parts of the levelling block 18 engage with their respective peripheral portions in opposing portions of the channel and its bottom 9, thus being retained in the desired position, which contributes to stiffening up the pack formed by the blocks 3,4 and levelling block 18.

Stay strips 7 are inserted between all or some of the horizontal rows of blocks 3,4 as illustrated in FIG. 1, these strips having the task of keeping the blocks 3,4 in their correct positions in the frame and facilitating assembly. A stay strip 7 is illustrated in FIG. 3 and consists of thin sheet metal having a thickness of 0.5 mm, for example. The ends of the strip are adapted for engagement with the channel 8, and along both its edges it is provided with tags or tongues 7a, alternately extending in opposite directions perpendicular to the plane of the strip. After fitting, these tags 7a bear against the respective portions of the blocks 3,4 to retain said blocks in position. This also applies to the levelling block 18. Since the stay strips 7 are easily bent at right angles to their longitudinal direction, they can be put in place without difficulty, even if cables have already been passed through the transit.

Different possibilities of fitting the transit in accordance with the invention are illustrated in FIGS. 5-7. FIG. 5 illustrates the transit consisting of frame halves 15, 16 fitted to a ship's bulkhead 11 made from steel. Since openings in such bulkheads do not have corners with sharp edges for the purpose of avoiding stress concentrations and must also, according to classification standards, be provided with a reinforcement 12 which forms a wall in the transit at the same time, the frame half sides can be foreshortened while the necessary total transit length is maintained. The figure also shows two reserve blocks 4 with their associated tube 13. The flanges 2 of each frame half 15,16 are each welded to the reinforcement 12. After the cables have been passed through the opening in the frame and all the components described above have been fitted in place, it is possible to fill the cavities of the transit with a pouring composition 14 via the open, upper sides of the frame portions in a known manner, the consistence of the compositions being such that it definitely fills up all cavities. The pouring composition 14 is preferably curable and of the two-component type, and naturally withstands temperatures occurring during a fire, as well as having suitable heat conductivity.

FIGS. 6 and 7 illustrate somewhat modified embodiments of the transit. In this case, each frame half 15,16 includes a part of the metal sheet 1 which extends to form a fourth side, uppermost in the figures, arranged similar to the remaining three sides of the frame half, and with its outer edge disposed so as not to interfere with the action of the pressure plate 6. This upper side is also provided with an attachment flange 2 for fixing to the wall, and for filling the transit with pouring composition 14, provided with a filling hole 19, which can be seen in FIG. 6. In the transit halves 15,16 illustrated in FIGS. 6 and 7, the pressure plate 6, illustrated in perspective in FIG. 8, is screwed onto the upper side by means of screws 10 passing through free holes in the plate, so that its channel 8 registers with the appropriate profiled portions of the vertical sides and can exercise pressure on the blocks. The transit illustrated in FIG. 6 is fitted to a steel wall 11, and is placed on the outside of reinforcement 12, while the transit in FIG. 7 is taken through the hole in a wall 11 made from concrete, for example, the flanges 2 on both frame halves being on one side of said wall and attached thereto by fixing means (not shown). After cables have been taken through the transit, and blocks together with parts described above are fitted in the frame halves 15,16, the pressure plates 6 are tightened down, and the transit is ready for filling with pouring composition, if this is required with regard to the required safety time for the transit.

On its fourth side, each frame half 15,16 can be provided with an extension of the sheet 1 completely covering this side, so that the frame half is completely and tightly enclosed, instead of the modified embodiment according to FIGS. 6 and 7. For packing the blocks 3,4 together, a wedge combination described in the U.S. Pat. No. 3,282,544 can be used, for example. A pressure-tight lead-through or transit will thus be obtained.

In principle, each frame half can furthermore replace the frame included in known transits. For fitting only one frame half on a roof it is also possible to fill it with pouring composition.

What we claim is:

1. A lead-through or transit for the fireproof disposition of electric cables through an opening in a wall or the like, comprising a metal frame the opening of which accommodates the cables and modularly dimensioned blocks surrounding each cable, as well as stay strips inserted between rows of blocks for stiffening the pack formed by the blocks, characterized in that the frame is formed by at least one frame half which is fitted on one side of the wall directly opposite the opening in said wall, the frame half on at least three sides comprising comparatively thin metal plate or sheet, extending substantially perpendicular to the wall and including a profiled portion in the form of a channel or trough, which has its longitudinal axis substantially parallel to the edge of the sheet remote from the wall, said portion extending towards the wall from the vicinity of this edge, with its bottom in a plane outside the non-profiled portion of the frame half side, while the fourth side of the frame half is formed by at least one pressure plate bearing against the blocks in the transit, said plate having the same profile as the channel-like portions of the other three sides along its edge portion remote from the wall, and that the opening in the frame half is filled with blocks and throughgoing cables such that the appropriate sides of peripheral blocks engage against the bottoms of said channels formed by said profiled portions.

2. A lead-through or transit as claimed in claim 1, characterized in that the frame half is provided with an attachment flange along its edge portion facing towards the wall and extending in the same plane as the wall.

3. A lead-through or transit as claimed in claim 1, characterized in that the frame half, in addition to the pressure plate, has on its fourth side a metal sheet disposed in the same way as the sheet forming the remaining three sides of the frame half, and in depth extending substantially from the wall to the region of the pressure plate.

4. A lead-through or transit as claimed in claim 3, characterized in that the pressure plate is fastened to the metal sheet and that this combination substantially covers the fourth side of the frame half.

5. A lead-through or transit for the fireproof disposition of electric cables through an opening in a wall or the like, comprising a metal frame the opening of which accommodates the cables and modularly dimensioned blocks surrounding each cable, as well as stay strips inserted between rows of blocks for stiffening the pack formed by the blocks, characterized in that the frame is formed by at least one frame half which is fitted on one side of the wall directly opposite the opening in said wall, the frame half on at least three sides comprising comparatively thin metal plate or sheet, extending substantially perpendicular to the wall and including a profiled portion in the form of a channel or trough, which has its longitudinal axis substantially parallel to the edge of the sheet remote from the wall, said portion extending towards the wall from the vicinity of this edge, with its bottom in a plane outside the non-profiled portion of the frame half side, while the fourth side of the frame half consists of metal sheet with substantially the same form as that of the other three sides, and that the opening in the frame half is filled with blocks and throughgoing cables, such that the respective sides of peripheral blocks engage against the bottoms of said channels formed by said profiled portions.

6. A lead-through or transit as claimed in claim 5, characterized in that the blocks with associated cables are compressed by means of a wedge combination.

7. A lead-through or transit as claimed in claim 5, with a frame half on each side of the wall, characterized in that the space remaining inside the transit when completely assembled with the two frame halves, the end walls formed by the blocks and the cables passing through it is filled with pouring composition.

8. A lead-through or transit as claimed in claim 7, characterized by tubes extending between blocks in both end walls and corresponding in position to each other, so that laying cables through these tubes will be enabled, even after the transit has been filled with pouring composition.

9. A lead-through or transit as claimed in claim 7, characterized in that the pouring composition is of the two-component type and is curable.

10. A lead-through or transit as claimed in claim 1 or 5, characterized in that each stay strip is bendable along a line at right angles to its longitudinal direction and of a comparatively thin material, which engages with its ends in the channel and along both edges between said ends is provided with flaps or tongues extending alternately in opposite directions perpendicular to the plane of the strip, and thus along the respective free outside and inside portions of the blocks.

11. A lead-through or transit for the fireproof disposition of electric cables through an opening in a wall or the like, comprising a metal frame having an opening for accommodating the cables, the frame being formed by at least one frame half having at least three sides comprising comparatively thin metal plate or sheet and including a profiled portion in the form of a channel or trough, which has its longitudinal axis substantially parallel to one edge of the sheet, said portion extending toward the opposite edge from the vicinity of said one edge, with its bottom in a plane outside the non-profiled portion of the frame half side, while the fourth side of the frame half is formed by at least one pressure plate having an edge portion which has the same profile as the channel-like portions of the other three sides, the opening in the frame half being filled with packing blocks such that the appropriate sides of peripheral blocks engage against the bottoms of said channels formed by said profiled portions.

12. A lead-through or transit as in claim 11 wherein each frame half is provided with an attachment flange along its opposite edge.

13. A lead-through or transit as in claim 12 including cables passing through the blocks, and wedge means compressing the blocks.

14. A lead-through or transit as in claim 11 wherein the frame half, in addition to the pressure plate, has on its fourth side a metal sheet disposed in the same way as the sheet forming the remaining three sides of the frame half, and in depth extending substantially from the the opposite edge to the region of the pressure plate.

15. A lead-through or transit as in claim 14 wherein the pressure plate is fastened to the metal sheet, the combination of pressure plate and metal sheet substantially covering the fourth side of the frame half.

16. A lead-through or transit as in claim 11 or 12 wherein said blocks are arranged in rows with stiffening plates between the rows, each stiffening plate being a stay strip bendable along a line at right angles to its longitudinal direction and of a comparatively thin material, which engages with its ends in the channel and along both edges between said ends is provided with flaps or tongues extending alternately in opposite directions perpendicular to the plane of the strip, and thus along the respective free outside and inside portions of the blocks.

* * * * *